United States Patent [19]

Dalrymple

[11] 4,390,089
[45] Jun. 28, 1983

[54] TORQUE CONVERTER

[76] Inventor: Peirce E. Dalrymple, 1671 Bedford Sq., Rochester, Mich. 48063

[21] Appl. No.: 240,907

[22] Filed: Mar. 5, 1981

[51] Int. Cl.³ .................................................. F16D 43/14
[52] U.S. Cl. .............................. 192/105 B; 192/30 R; 192/52; 192/103 R
[58] Field of Search .......... 192/105 B, 105 A, 103 R, 192/103 A, 103 B, 52, 38, 30 R; 74/198

[56] References Cited

U.S. PATENT DOCUMENTS

| 1,682,493 | 8/1928 | Ehrenfeld | 192/105 B |
| 1,948,084 | 2/1934 | Welch | 192/105 B |
| 2,678,119 | 5/1954 | Birbaum | 192/105 B |
| 2,956,656 | 10/1960 | Becksted | 192/94 X |
| 3,330,392 | 7/1967 | Garay | 192/103 B |
| 3,367,198 | 2/1968 | Schottler | 74/198 |
| 3,737,014 | 6/1973 | Dalrymple | 192/38 X |
| 4,285,422 | 8/1981 | Bentley | 192/105 B |

Primary Examiner—Rodney H. Bonck
Attorney, Agent, or Firm—Harold W. Milton, Jr.

[57] ABSTRACT

A torque converter including a distortable rotatable center disc disposed between a pair of freely rotatable plate members. Roller elements are disposed between the center disc and the plate members. The roller elements are radially movable under the influence of centrifugal force for variably distorting the center disc in a wave-like fashion between deactuated and actuated conditions to rotate the plate members at a speed relative to the center disc in proportion to the amount of the distortion of the center disc.

13 Claims, 3 Drawing Figures

TORQUE CONVERTER

BACKGROUND OF THE INVENTION (1) Field of the Invention

The instant invention relates to a centrifugally actuated torque converter assembly which may be utilized to variably transfer torque from a rotating shaft to a rotating output or vice versa.

(2) Description of the Prior Art

There are various torque converters known in the prior art. Many of these prior art torque converters include elements sensitive to centrifugal force for providing a torque transfer condition. Additionally, these assemblies have included flexible members which coact with an interdisposed element to transfer torque.

SUMMARY OF THE INVENTION

The instant invention provides a torque converter assembly including a distortable input member rotatable about an axis and an output member freely rotatable about the axis relative to the input member in a deactuated condition and variably rotatable relative to the input member between the deactuated condition and a fully actuated condition at which the output member rotates at the same speed as the input member. The assembly is characterized by at least one roller element being disposed between the input member and the output member. The roller element is radially movable under the influence of centrifugal force for variably distorting a portion of the input member in a wave-like fashion between the deactuated and actuated conditions to rotate the output member at a speed relative to the input member in proportion to the amount of distortion of the input member.

PRIOR ART STATEMENT

The instant invention is an improvement over the U.S. Pat. No. 3,737,014 to William P. Dalrymple, issued June 5, 1973. The prior art assembly includes a pair of concentric cylindrical members having roller elements disposed therebetween. The roller elements are in rolling engagement with the concentric members. A hydraulic piston distorts one of the concentric members into an eliptical or other configuration to provide a distortion in the other member which moves therealong in a wave-like fashion. The transmission of energy between the members is proportional to the amount of distortion.

The instant invention represents an improvement over this prior are construction by utilizing an alternative to the hydraulic actuation means of that assembly and by providing a novel structure.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF PREFERRED EMBODIMENT

Figure 1:
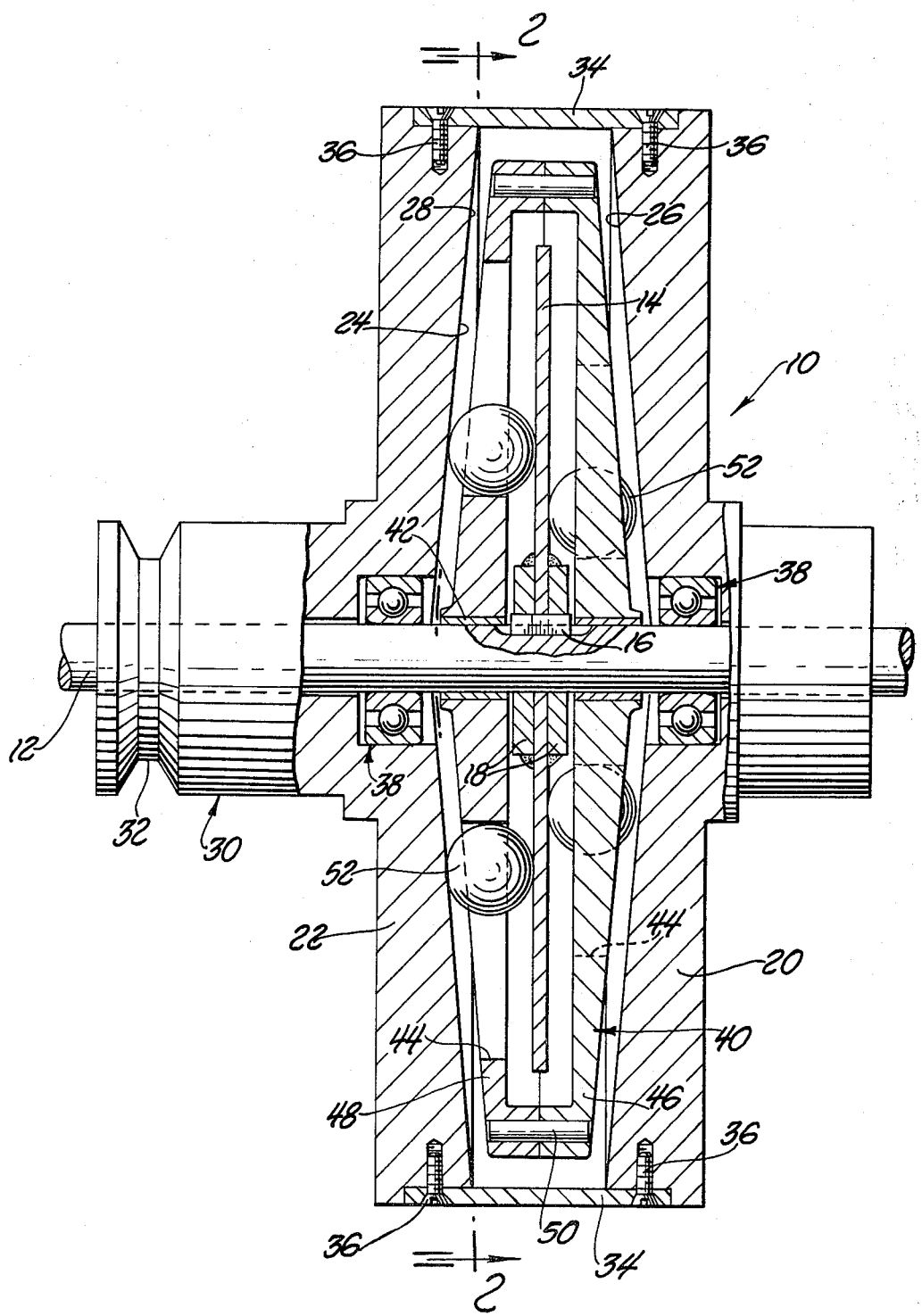
FIG. 1 is an elevational view partially broken away and in cross section of a preferred embodiment of the instant invention.

A torque converter assembly constructed in accordance with the instant invention is generally shown at 10.

The assembly 10 is supported on a shaft member 12. The shaft member 12 may function as an input drive member to provide rotational energy to the assembly 10 or, alternatively, the shaft member 12 may be an output member which is driven by the assembly 10, i.e., the words "input" and "output" as used herein are interchangeable and are used only for descriptive purposes.

A distortable center disc 14 is fixedly or non-rotatably mounted on the shaft member 12. In the preferred embodiment, the center disc 14 is keyed to the shaft member 12 by key 16 which extends radially outwardly from a slot in the shaft member 12. The center disc 14 also includes annular plates 18 welded thereto for support and reinforcement.

A pair of interconnected plate members 20 and 22 are mounted on and freely rotatable about the shaft member 12. Plates 20 and 22 define a compartment 24 therebetween, the compartment 24 having side walls 26 and 28. The side walls 26 and 28 taper radially outwardly from the shaft member 12 so as to be frustoconical. The walls 26 and 28 are disposed on each side or opposite sides of the center disc 14.

Plate member 22 includes an integral sleeve portion, generally indicated at 30, extending therefrom and about the shaft member 12. The sleeve portion 30 includes an annular groove 32 thereabout to define a pulley for transmitting torque. The groove 32 is adapted for receiving a belt entrained about another pulley. The belt may be entrained about a driven pulley so that rotational input or torque is transmitted to the pulley defined by the groove 32 to drive the shaft member 12 or the sleeve 30 may function as an output to a driven pulley, in which case the assembly 10 would be driven by the shaft member 12. Alternatively, the sleeve 30 may include a sprocket for driving a link chain.

The assembly 10 includes a connecting ring 34 for connecting the plate members 20 and 22 together about the center disc 14. As shown in FIG. 1, the connecting ring 34 is secured to the plate members 20 and 22 by screws 36. The connecting ring 34 may take many forms so long as it unites the plate members 20 and 22 for rotation in unison.

Bearing means, generally indicated at 38, are disposed between each of the plate members 20 and 22 and the shaft member 12 for providing a low friction surface therebetween. In the preferred embodiment, the bearing means includes ball bearings disposed within races that are well known in the prior art. Alternatively, sleeve bearings or bushings may be used.

Figure 2:
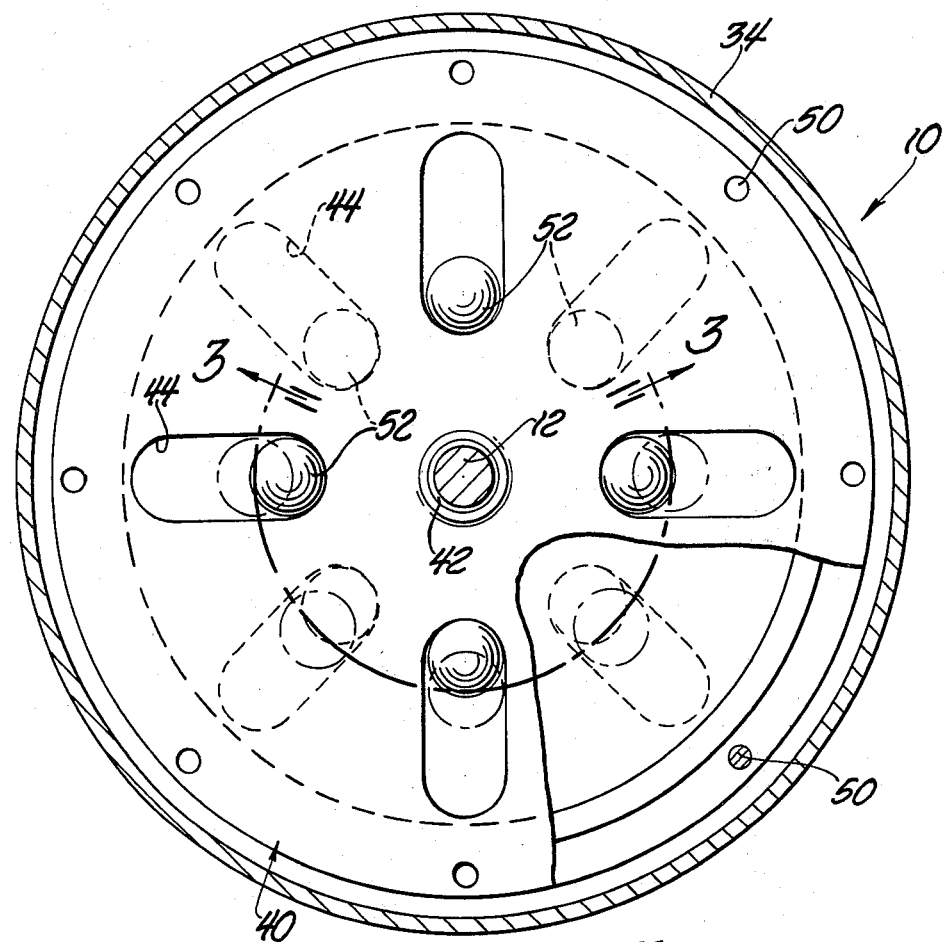
FIG. 2 is a cross-sectional view taken substantially along lines 2—2 of FIG. 1 and partially broken away.

A cage, generally indicated at 40, is disposed on each side of or on opposite sides of the center disc 14 and within the compartment 24. The cage 40 is freely rotatable about the shaft member 12. As shown in FIGS. 1 and 2, a sleeve bushing 42 is disposed between the shaft member 12 and each of the portions of the cage 40 which contact the shaft member 12. The cage 40 includes a plurality of radially extending slots 44 therethrough extending radially and being equally spaced from the shaft member 12. The slots 44 are alternately disposed on opposite sides of the center disc 14. In other words, each of the slots 44 on one side of the center disc 14 is annularly spaced between two adjacent slots 44 on the other or opposite side of the center disc 14.

As shown in FIG. 1, the cage 40 consists of two shell halves 46 and 48. The shell halves 46 and 48 are connected together by a plurality of pin members 50.

A plurality of spherical roller elements 52 are disposed in the slots 44. The roller elements 52 simultaneously contact the center disc 14 and one of the plate members 20 or 22. For the purposes of description, the disc 14 defines a distortable input means rotatable about the axis of the shaft 12 and the plate members 20 and 22 define output means freely rotatable about the shaft 12 relative to the input means in a deactuated condition where the elements 52 are disposed radially inwardly. The output means is variably rotatable relative to the input means between the deactuated condition and a fully actuated condition with the elements 52 in the radially outmost position so that the output means rotates at the same speed as the input means. The roller elements 52 are disposed between the input means or disc 14 and the output means or members 20 and 22 and are radially movable under the influence of centrifugal force for variably distorting the input disc 14 in a wave-like fashion between the deactuated and fully actuated conditions to rotate the output members 20 and 22 at a speed relative to the input disc 14 in proportion to the amount of distortion of the input disc 14.

Figure 3:
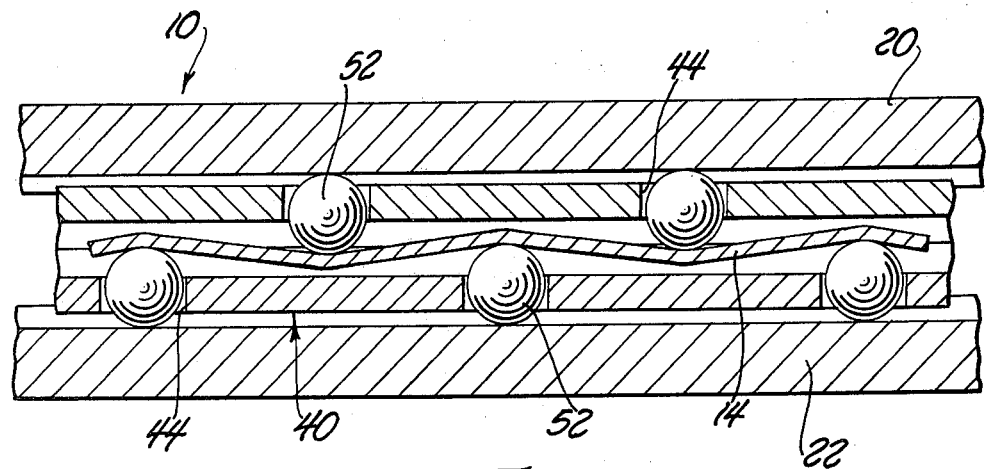
FIG. 3 is a fragmentary cross-sectional view developed along lines 3—3 of FIG. 2.

In operation, as the center disc 14 is actuated to rotate via the shaft member 12, frictional contact between the center disc 14 and roller elements 52 causes the roller elements 52 to rotate or roll between the center disc 14 and the plate members 20 and 22. The centrifugal force exerted on the roller elements 52 forces the roller elements 53 radially outwardly within the slots 44. As the roller elements 52 are forced radially outwardly, the frustoconical shape of the compartment 24 causes the roller elements 52 to distort the center disc 14, as shown in FIG. 3. The energy or rotational speed transmitted from the center disc 14 to the plate members 20 and 22 is proportional to the amount of distortion of the center disc 14. Thus, the increased speed of rotation of the center disc 14 increases the centrifugal force on the roller elements 52 thereby forcing the roller elements 52 radially outwardly so as to increase the distortion of the center disc 14 and increase the amount of energy or rotational speed transmitted from the center disc 14 to the plate members 20 and 22. In other words, through traction, the center disc 14 and the plate members 20 and 22 rotate at different speeds controlled by the outward forces acting on the roller elements 52. These forces are determined by the speed of rotation, the driving force applied by the disc 14, and the resistance to movement supplied by the plate members 20 and 22.

Alternatively, as previously described, the drive plates 20 and 22 can provide the input power to drive the shaft member 12. In this situation, the instant invention will operate in a reverse manner. Additionally, the plate member 20 may also include pulley means for providing an additional input or output means.

The instant invention may also be used as a control mechanism as opposed to it being used as a power transfer unit. For example, the actuated condition could be dependant upon the speed of rotation of the input shaft whereby the instant invention would provide a speed control mechanism.

The instant invention has been described in an illustrative manner and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

The embodiments of the invention in which an exclusive property or privilege is claimed are defined as follows:

1. A torque converter assembly (10) comprising: distortable input means (14) rotatable about an axis, output means (20, 22) freely rotatably about said axis relative to said input means (14) in a deactuated condition and variably rotatable relative to said input means (14) between said deactuated condition and a fully actuated condition at which said output means (20, 22) rotates at the same speed as said input means (14) and characterized by at least one roller means (52) disposed between said input means (14) and said output means (20, 22) and radially movable under the influence of centrifugal force for variably distorting a portion of said input means (14) in a wave-like fashion between said deactuated and fully actuated conditions to rotate said output means (20, 22) at a speed relative to said input means (14) in proportion to the amount of distortion of said input means (14).

2. An assembly as set forth in claim 1 wherein said output means (20, 22) includes a pair of radially outwardly tapering side walls (26, 28) which are frustoconical and disposed on opposite sides of said input means (14) for engaging said roller means (52).

3. An assembly as set forth in claim 2 wherein said input means (14) includes a shaft member (12) defining said axis and a distortable center disc member (14) non-rotatably mounted thereon, said output means (20, 22) being freely rotatable on said shaft member (12).

4. An assembly as set forth in claim 3 including cage means (40) disposed between said center disc member (14) and said side walls (26, 28) of said output means (20, 22) for limiting radial movement of said roller means (52), said cage means (40) being freely rotatable on said shaft member (12).

5. An assembly as set forth in claim 4 wherein said cage means (40) includes a shell (46, 48) having a portion disposed on each side of said center disc member (14) and including slots (44) therethrough, said roller means including a roller element (52) disposed in each of said slots (44), each of said slots (44) on one side of said center disc member (14) being annularly spaced between two adjacent slots (44) on the other side of said center disc member (14).

6. An assembly as set forth in claim 5 wherein said output means (20, 22) includes a pair of interconnected plate members (20, 22) mounted on and freely rotatable about said shaft member (12), each of said plate members (20, 22) including one of said side walls (26, 28) with each side wall being disposed adjacent and outwardly of one of said portions of said shell (46, 48).

7. An assembly as set forth in claim 6 wherein at least one of said plate members (22) includes pulley means (30) connected thereto for transmitting power.

8. An assembly as set forth in claim 7 wherein said pulley means (30) includes an integral sleeve portion (30) extending from said one plate member (22) and about said shaft member (12) and an annular groove (32) in said sleeve portion (30).

9. An assembly as set forth in claim 8 including a connecting ring (34) for connecting said pair of plate members (20, 22) together about said shell (40) and said flexible center disc member (14).

10. An assembly as set forth in claim 9 wherein said connecting ring (34) includes a first edge secured to one of said plate members (20) and a second edge secured to the other of said plate members (22).

11. An assembly as set forth in claim 9 including bearing means (38) disposed between each of said plate members (20, 22) and said shaft member (12) for providing a low friction surface therebetween.

12. An assembly as set forth in claim 9 including a plurality of said roller elements (52) with each roller element (52) being spherical in configuration.

13. A torque converter assembly (10) comprising: a shaft member (12); a distortable center disc (14) non-rotatably mounted on said shaft member (12); a pair of interconnected plate members (20, 22) freely rotatable about said shaft member (12) in a deactuated condition and variably rotatable relative to said center disc (14) between said deactuated condition and a fully actuated condition at which said plate members (20, 22) rotate at the same speed as said center disc (14), each of said plate members (20, 22) including a radially outwardly tapering side wall (26, 28), said walls (26, 28) being frustoconical and disposed on opposite sides of said center disc (14), at least one of said plate members (22) including an integral sleeve portion (30) extending from said plate member (22) and about said shaft member (12) with an annular groove in said sleeve portion (30) for transmitting power; a connecting ring (34) including a first edge secured to one of said plate members (20) and a second edge secured to the other of said plate members (22); roller bearings (38) disposed between each of said plate members (20, 22) and said shaft member (12) for providing a low friction surface therebetween; a cage shell (46, 48) freely rotatable on said shaft member (12) having a portion disposed on each side of said center disc (14) and including radially extending slots (44) therethrough, each of said slots (44) on one side of said center disc (14) being annularly spaced between two adjacent slots (44) on the other side of said center disc (14); and a plurality of spherical roller elements (52), each of said roller elements (52) disposed in a corresponding slot (44) and simultaneously contacting said center disc (14) and one of said plate members (20, 22) and radially movable under the influence of centrifugal force for variably distorting a portion of said center disc (14) in a a wave-like fashion between said deactuated and actuated conditions to rotate said plate members (20, 22) at a speed relative to said center disc (14) in proportion to the amount of distortion of said center disc.

* * * * *